United States Patent [19]
Huang

[11] Patent Number: 5,469,988
[45] Date of Patent: Nov. 28, 1995

[54] APPARATUS FOR DISPENSING PARTICULATE CONDIMENTS

[76] Inventor: Douglas X. Huang, 420 Maynard Ave. South #318, Seattle, Wash. 98104

[21] Appl. No.: 237,643

[22] Filed: May 4, 1994

[51] Int. Cl.⁶ ................................................. G01F 11/00
[52] U.S. Cl. ........................... 222/1; 222/129; 222/162; 222/429; 222/448; 222/452; 222/485
[58] Field of Search ............................. 222/1, 129, 162, 222/425, 426, 427, 429, 448, 449, 450, 451, 452, 485

[56] References Cited

U.S. PATENT DOCUMENTS

| | | | |
|---|---|---|---|
| 807,484 | 12/1905 | Moss | 222/429 X |
| 1,139,269 | 5/1915 | Goodman et al. | 222/429 |
| 3,181,739 | 5/1965 | Dye | 222/429 X |
| 3,260,419 | 7/1966 | Weimer et al. | 222/309 |
| 4,876,043 | 10/1989 | Hall, Sr. | 222/162 X |
| 5,386,930 | 2/1995 | Shani | 222/448 X |

FOREIGN PATENT DOCUMENTS

| | | | |
|---|---|---|---|
| 2643876 | 9/1990 | France | 222/451 |
| 1518226 | 10/1989 | U.S.S.R. | 222/448 |

Primary Examiner—Andres Kashnikow
Assistant Examiner—Joseph A. Kaufman
Attorney, Agent, or Firm—Richardson & Folise

[57] ABSTRACT

A device for dispensing particulate condiments comprising a condiment hopper translatably mounted on a transfer plate having a gated reservoir for receiving and dispensing condiments from the hopper. The invention also includes a method for dispensing particulate condiments comprising translating an open-bottomed condiments hopper over a transfer plate having a gated reservoir to transfer a predetermined aliquot of condiments from the hopper to the reservoir. The method further includes closing a dispensing aperture of the reservoir while the hopper is in register with a transfer opening of the reservoir, and opening the dispensing aperture to dispense the aliquot of condiments when the hopper is out of register with the transfer opening.

23 Claims, 3 Drawing Sheets

APPARATUS FOR DISPENSING PARTICULATE CONDIMENTS

TECHNICAL FIELD

The invention relates to condiment dispensing devices for use in the preparation of food. More specifically, the invention relates to devices for dispensing predetermined quantities of particulate condiments onto food items.

BACKGROUND OF THE INVENTION

In the commercial preparation of food products for sale, it is desirable to employ utensils and other implements which facilitate rapid and simple processing of the foods. Particularly in large volume food preparation operations, such as fast-food restaurants, snack bars and delicatessens, an important and time consuming step in food processing is the dispensing of seasonings and condiments onto the partially prepared foods. Seasonings and condiments are typically applied to food items after cooking and prior to sale, accounting for a considerable fraction of the overall labor and material costs necessary to produce salable products. Therefore, it is particularly desirable to utilize a condiment dispensing device which is quick, and which maximizes the uniformity of condiment distribution onto the food item. Uniformity in terms of the amount, and pattern of condiments distributed onto the food enhances the uniformity of appearance and taste of the final food product, as desired in a typical franchise operation. In addition, distribution of a pre-determined amount of condiments in an accurate pattern onto the food minimizes spillage and therefore reduces material wastage and sanitary problems.

Conventional methods for distributing condiments in fast-food settings are typically limited to manual procedures, such as using spoons, ladles, shakers and other basic utensils to distribute the condiments, or simply sprinkling the condiments by hand over the food item. Such methods have obvious drawbacks in terms of time, uniformity and sanitation, particularly in large volume operations.

Condiment dispensers which attempt to overcome these drawbacks are known, but are limited to devices for dispensing liquid and semi-liquid condiments. The most widely used condiment dispensing apparatus is a simple siphon pump for dispensing liquid condiments, such as catsup, mustard and mayonnaise, from a storage tank.

A more advanced condiment dispenser has been developed for dispensing liquid and semi-liquid, condiments in fast-food production settings. This device, described in U.S. Pat. No. 3,260,419, issued to Weimer et al., is a hand held dispenser which incorporates a conical container having a dispensing opening at its base through which liquid condiments are dispensed via a diffusor valve onto a selected food item. A hand operated actuating lever actuates a piston which exerts force on an aliquot of condiments held in a narrow, rechargeable dispensing bore of the shell. Pressure from the piston forces the liquid in the bore through a series of narrow openings in the diffusor valve, resulting in the dispensing of a pre-determined amount of condiment in a regular pattern over the food item.

Although the Weimer dispenser is useful for dispensing liquid and semi-liquid condiments, the device is inoperable for dispensing particulate condiments, such as relishes and chopped onions. In particular, the bore of the Weimer dispenser communicates with the main volume of the shell via a series of narrow recharging ports. When the contents of the bore are discharged, the reversing piston creates a vacuum in the bore to recharge the bore with fluid from the main volume of the shell. This design imposes severe constraints in terms of clogging of the device, which would result from congestion of non-liquid materials in the recharging ports. In addition, the narrow openings of the diffusor valve employed by the Weimer dispenser would also become clogged by particulate condiments. Lastly, because a vacuum mechanism is used to recharge the dispensing bore of the Weimer apparatus, the device would not function to dispense non-liquid contents.

A further disadvantage of the Weimer dispenser is that the apparatus is structurally and mechanically complex, and therefore difficult to disassemble for washing. In particular, the dispensing mechanism alone features a piston with a collar and flange, a compression spring, a cylinder with communication ports and a diffusor valve, among other components; all of which are arranged in a complex assembly, making disassembly for cleaning difficult and time consuming. In addition, the dispensing mechanism and other components of the Weimer dispenser feature various openings, nooks and crevasses in which condiment materials would tend to accumulate and clog, whereby cleaning would be even more difficult and time consuming.

On the basis of these considerations, a need exists in the commercial food preparation industry for a condiment dispenser designed to rapidly and repeatedly dispense particulate condiments onto partially prepared food items. A further need exists for a condiment dispensing apparatus designed to efficiently dispense particulate condiments in a uniform pattern and amount, and which is easily disassembled for cleaning to minimize labor and material costs, and reduce sanitary problems.

SUMMARY OF THE INVENTION

It is therefore an object of the present invention to provide a commercially useful method and device for easily and rapidly dispensing particulate condiments onto partially prepared food items.

It is a further object of the invention to provide a condiment dispenser and method for efficiently dispensing particulate condiments onto food items in a uniform amount and pattern, to minimize handling and clean-up expenses and materials wastage, and to enhance the appearance, taste and uniformity of the final food product.

The invention achieves these and other objects and advantages which will become apparent from the description which follows by providing a condiment dispensing device including a transfer plate having an aliquoting reservoir which has a transfer opening for receiving an aliquot of condiments from a condiment hopper assembly. The hopper assembly is translatably mounted on the transfer plate and includes a condiment hopper having an open bottom which is registrable with the transfer opening. Translation of the hopper assembly over the plate brings the bottom opening of the hopper into register with the transfer opening, to transfer an aliquot of condiments from the hopper into the reservoir. The invention also provides valve means which are responsive to the position of the hopper with respect to the transfer opening for controlling the dispensing of condiments from the reservoir. As a result of this design, a pre-determined aliquot of condiments is transferred from the hopper to the reservoir when the bottom of the hopper is translated into register with the transfer opening, and the aliquot is dispensed from the dispensing aperture when the bottom of the hopper is translated out of register with the transfer opening.

In a more detailed aspect of the invention, the valve means has a first closed position, an intermediate open position and a second closed position, whereby functioning of the valve means is characterized by a successive change from a closing to an opening, then back to a closing operational status.

In an additional detailed aspect, the invention provides a transfer plate having a plurality of aliquoting reservoirs, wherein each reservoir has a transfer opening. The reservoirs can be arranged in a plurality of dispensing rows, and a plurality of hoppers can be provided wherein each hopper is registrable with a separate dispensing row, so that the condiments can be dispensed accurately and uniformly onto multiple rows of food items at once. For this purpose, it is preferable to employ a hopper carriage as part of the hopper assembly to uniformly guide and translate the hoppers in unison with respect to the plate.

In a further detailed aspect, the valve means of the invention includes a gating tray slidably mounted beneath the transfer plate for controlling the dispensing of condiments from the reservoir. The gating tray has a release gate and a barrier tab, the gate and tab being registrable with a dispensing aperture of the reservoir. The gating tray can also include an engagement mechanism for coordinating operation of the gating tray with translation of the hopper, whereby opening and closing of the reservoir is coordinated with translation of the hopper.

The invention can further be summarized as providing a method for dispensing particulate condiments. A loaded condiment hopper slidably mounted above a transfer plate having a reservoir with a transfer opening registrable with a bottom opening of the hopper is translated with respect to the plate so that the bottom opening of the hopper successively passes into, then out of, register with the transfer opening. A dispensing aperture of the reservoir is closed while the bottom opening is in register with the transfer opening, and opened when the bottom opening is out of register with the transfer opening, whereby an aliquot of condiments is transferred from the hopper to the reservoir when the bottom opening is in register with the transfer opening, and is dispensed from the reservoir when the bottom opening is out of register with the transfer opening.

DETAILED DESCRIPTION OF THE PREFERRED EMBODIMENTS

Figure 1:
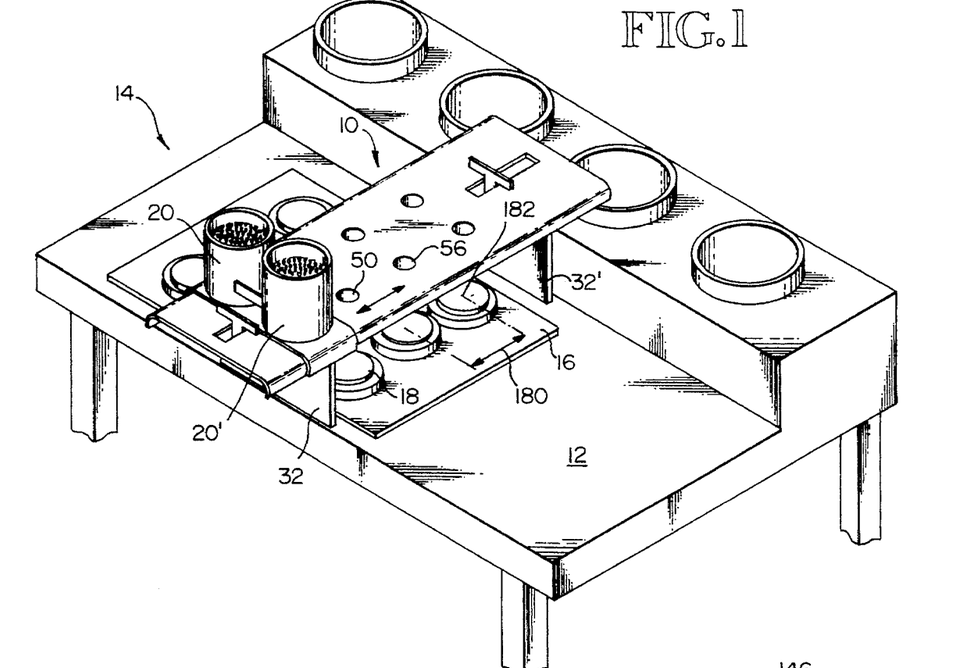
FIG. 1 is an environmental view showing a condiment dispenser employing the concepts of the present invention.

A condiment dispensing device employing the concepts of the present invention is generally indicated at reference numeral 10 in FIG. 1. As shown in the Figure, the dispenser can be used atop a working surface 12 of a food preparation station 14 by placing the dispenser over a food staging tray 16 or other surface having food items 18, such as hamburgers, staged thereon.

Figure 2:
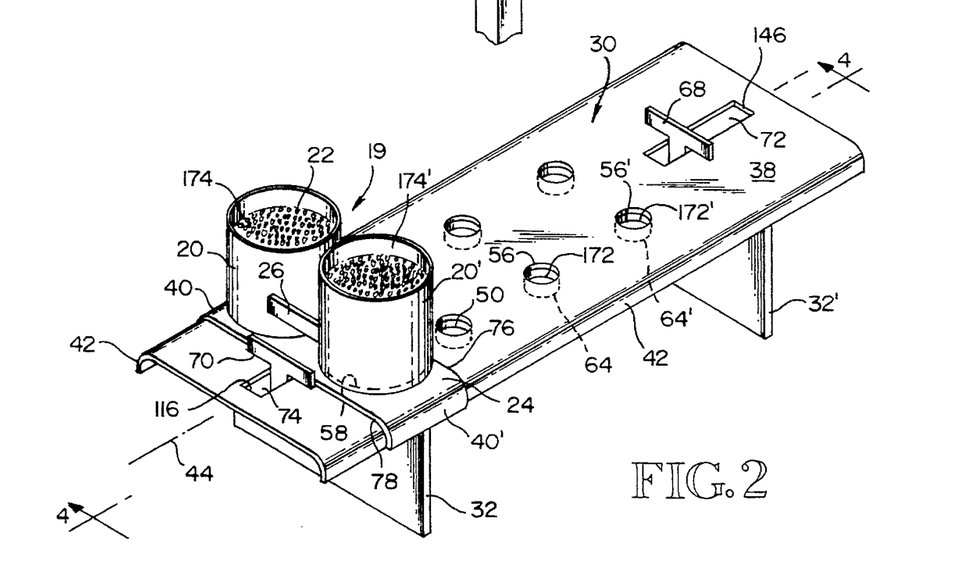
FIG. 2 is an isometric view of the device shown in FIG. 1.

As shown in FIG. 2, the device includes a hopper assembly 19 including one or more hoppers 20, 20' suitable for holding a working supply of particulate condiments 22, such as relishes, chopped onions or other food toppings, seasonings, additives and decorations. The hoppers are translatably mounted on a transfer plate 30 which is supported by a pair of legs 32 32', cables or mounting brackets (not shown) above the staging tray 16.

The hopper assembly preferably includes a hopper carriage 24 and a handgrip 26 to facilitate translational movement of the hopper assembly over the transfer plate. The hoppers 20, 20' can be mounted directly onto the hopper carriage, which is in turn translatably mounted on an upper surface 38 of the transfer plate. The carriage optionally includes downturned lateral flanges 40, 40' for engaging downturned sides 42, 42' of the transfer plate, so that the hoppers slide parallel to a longitudinal axis 44 of the transfer plate during translation of the hopper assembly over the plate.

The transfer plate 30 includes one or more aliquoting reservoirs 50, 50' optionally arranged in longitudinal dispensing rows. The reservoirs are sized and positioned on the plate for receiving and dispensing condiments from the hoppers 20, 20'. At the top of each reservoir there is a transfer opening 56, 56' which admits an aliquot of condiments into the reservoir from a bottom opening 58, 58' of a corresponding hopper, each of which is aligned with a corresponding dispensing row, so that the bottom opening of the hopper can be translated into partial or complete register with each of the transfer openings in the row.

Figure 3:
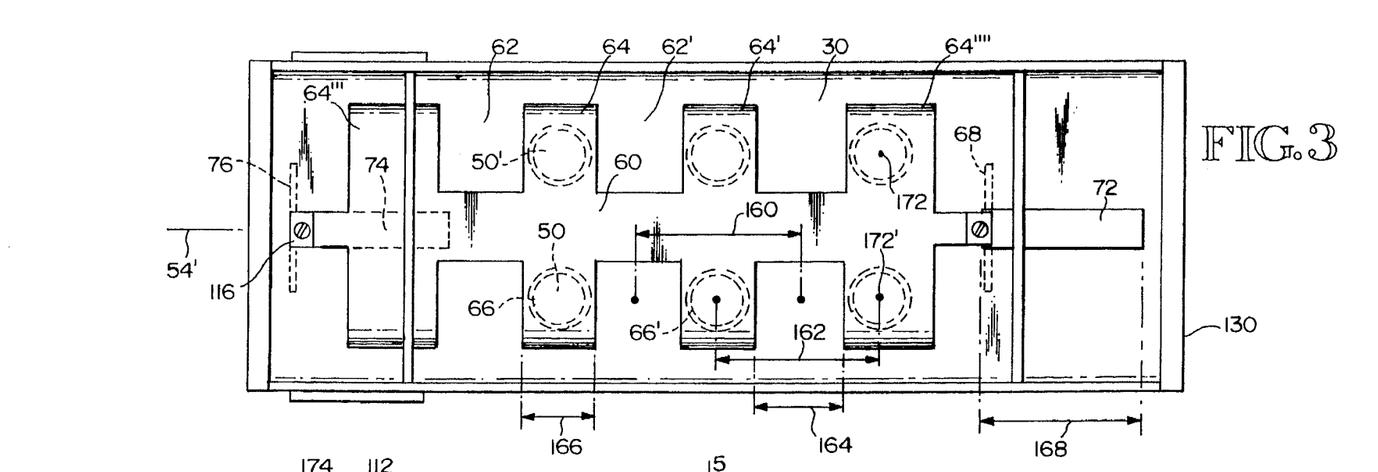
FIG. 3 is a bottom plan view of the device shown in FIG. 1.
Figure 4:
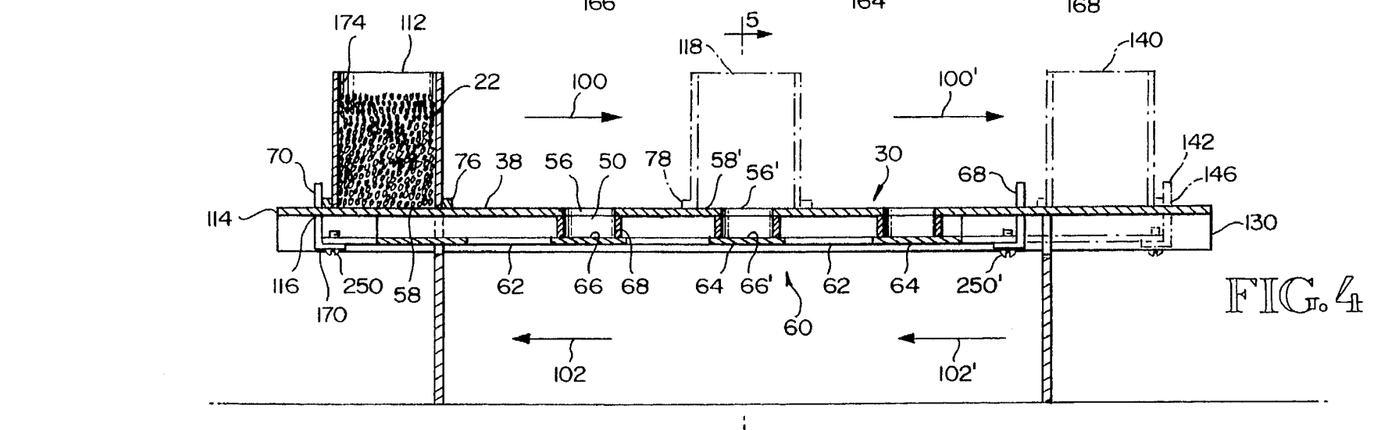
FIG. 4 is a sectional view of the invention taken along line 4—4 of FIG. 2.

To control the dispensing of condiments from the reservoirs 50, 50', the invention provides a unique valve mechanism or gating tray 60 which is functionally responsive to the position of the hoppers. As illustrated in FIGS. 3 and 4, the gating tray is slidably mounted beneath the transfer plate 30 and has a series of alternating release gates 62, 62' and barrier tabs 64, 64'. The gates and tabs are designed to respectively open and close dispensing apertures 66, 66' located at the bottoms of the reservoirs when the gates or tabs are selectably aligned with the dispensing apertures.

Selectable alignment of the release gates 62, 62' and barrier tabs 64, 64' with the dispensing apertures 66, 66' is accomplished by structural and operative coupling between the gating tray 60 and the hopper assembly 19. This coupling can be provided by front 68 and rear 70 gate-switching fingers connected to opposite ends of the gating tray. As shown in FIG. 2, the fingers extend upward through front 70 and rear 72 gate-switching slots in the tray. The front finger is engagable by a front edge 76 of the hopper assembly and the rear finger is engagable by a rear edge 78 of the hopper assembly during forward (arrows 100, 100') and reverse (arrows 102, 102') translation of the hoppers over the plate, respectively.

Method of Operation

Figure 5:
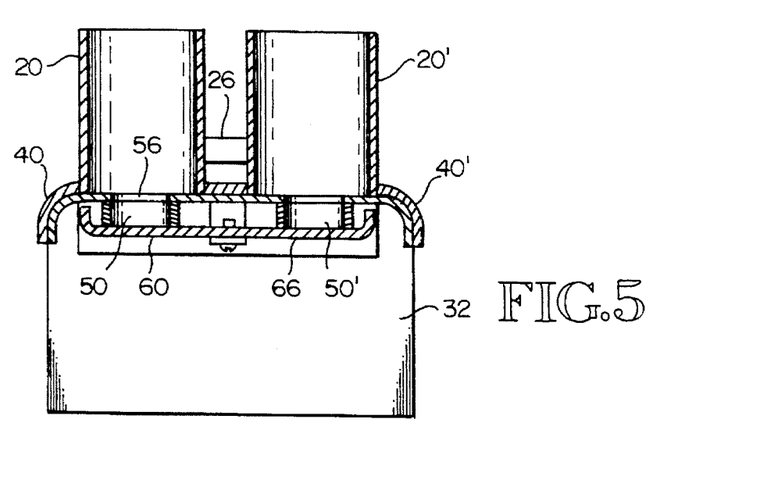
FIG. 5 is a sectional view of the invention taken along line 5—5 of FIG. 4.

To operate the invention, the transfer plate 30 is positioned over a selected food item 18 or group of items staged on a tray 16 or other suitable surface. The hoppers 20, 20' are loaded with particulate condiments 22 and the hopper assembly 19 is slidably mounted atop the transfer plate. The hopper assembly is initially placed in a rear starting position 112 (see FIG. 4), where the assembly is slid as far as possible toward a rear edge 114 of the transfer plate. In this position, the rear edge 78 of the hopper carriage 24 rests against the rear gate-switching finger 70, and the rear finger rests against a rear wall 116 of the rear gate-switching slot 74. In this starting position, the bottom openings 58, 58' of the hoppers can communicate only with the upper surface 38 of the transfer plate, and are therefore out of register or communication with all of the transfer openings 56, 56'. Also in this position, the gating tray is in a rear reset or closing position, as shown in FIGS. 3 and 5, wherein all of the dispensing apertures 66, 66' of the reservoirs 50, 50' are blocked due to registration of the dispensing apertures with the underlying barrier tabs 64, 64' of the gating tray.

From the starting position 112, the hoppers 20, 20' are translated along the transfer plate 30 by manually engaging the hoppers, hopper carriage 24 or handgrip 26 and pushing or pulling the hopper assembly in the forward direction (arrows 100, 100'). As the hopper assembly slides along the plate, the bottom openings 58, 58' of the hoppers successively pass into, then out of, a registered position 118 with the first set of transfer openings 50, 50' in their path in the corresponding dispensing rows. As the bottom openings pass into register with the transfer openings, condiments 22 fall from the bottom openings through the transfer openings into the reservoirs 50, 50', until the reservoirs become filled with an aliquot of condiments ready to be dispensed.

As the hopper assembly continues forward, the bottom openings 58, 58' pass out of register with the first set of transfer openings 50, 50' in their forward path. Further translation of the hopper assembly successively brings the bottom openings 58, 58' into, then out of, register with each of the remaining transfer openings in the corresponding dispensing rows, until the hopper assembly reaches a forward terminal leg of translation. This is the point during forward translation when the hopper assembly passes entirely out of register with the last transfer opening in its path, i.e. the nearest transfer opening to a front edge 130 of the transfer plate 30, and continues forward so that an advancing edge of the hopper assembly, for example the front edge 76 of the hopper carriage 24, engages the front gate-switching finger 68 of the gating tray 60, thereby triggering sliding of the tray and dispensing of condiments from all of the filled reservoirs at once.

Dispensing of condiments from the reservoirs 50, 50' is controlled by the gating tray 60, shown in FIGS. 3 and 4, which is slidably mounted beneath the transfer plate 30 and functionally interconnected with the hoppers by the front 68 and rear 70 gate-switching fingers. The fingers are connected to opposite ends of the gating tray and extend upward through front 72, and rear 74 gate-switching slots in the tray to engage the advancing front 76 or rear 78 edges of the hopper carriage, during forward (arrows 100, 100') or rearward (arrows 102, 102') translation of the hopper assembly, respectively. When the hoppers are moved through the forward terminal leg of translation, the front edge 76 of the hopper carriage 24 engages the front gate-switching finger and causes the gate to slide in the forward direction with respect to the transfer plate. As the tray moves forward, the barrier tabs 64, 64' which were initially in register with the dispensing apertures 66, 66' move out of register with the apertures, and the release gates 62, 62' move into register with the apertures, whereby the dispensing apertures are opened and an aliquot of condiments is dispensed from each of the reservoirs 50, 50' onto the underlying food item 18.

Further forward translation of the hopper assembly brings the assembly into a front starting position 140 (see FIGS. 3 and 4), wherein the assembly is slid as far as possible toward the front end 130 of the transfer plate, and the bottom openings 58, 58' of the hoppers communicate only with the upper surface 38 of the transfer plate. This final forward movement of the hopper assembly also results in completion of a cycle of opening and closing operation by the gating tray, wherein the tray 60 is driven forward by the hoppers to a front reset, or opening position 142, illustrated in phantom in FIG. 4. In this position, the front gate-switching finger 68 rests against the front wall 146 of the front gate-switching slot 72. Also in this front reset position, the barrier tabs have been slid forward to become positioned once again in register with the dispensing apertures 66, 66' of the reservoirs 50, 50', thereby closing the apertures to enable their subsequent refilling upon reverse translation of the hopper assembly.

The above described cycle of opening and closing operation of the gating tray 60 in response to forward terminal translation of the hopper assembly 19 depends in part on the size and spacing of the release gates 62, 62' and barrier tabs 64, 64' of the gating tray. An inter-gate distance 160 between release gates of the gating tray must be approximately the same as an inter-aperture distance 162 between dispensing apertures 66, 66' of the reservoirs 50, 50' (see FIG. 3). In addition, a gate length 164 dimension must be approximately the same as an aperture length 166 dimension. These structural features ensure that all of the dispensing apertures are closed and opened in unison when the gating tray is slid in a forward or reverse direction. Lastly, the gating tray should include front terminal 64''' and rear terminal 64'''' barrier tabs at either end, and the gate-switching slots 72, 74 should have a slot length 168 approximately equal to the inter-aperture distance, to ensure that the gating tray travels through a complete cycle of opening and closing operation to reach a front 142 or rear 170 reset position during a terminal leg of unidirectional, i.e. forward (arrows 100, 100') or reverse (102, 102'), translation of the hopper assembly.

Once the hopper assembly 19 has been translated through a complete path of forward translation, so that the reservoirs 50, 50' have been filled, emptied and then re-closed by the gating tray 60, a second round of condiment dispensing can be performed. Prior to the second round of dispensing, the food tray 16 is shifted relative to the transfer plate 30 so that an un-garnished food item 18 or items underlies the dispensing aperture(s) 66, 66'. Next, the hopper assembly is simply translated back over the transfer plate through another complete path of unidirectional translation, only this time in the reverse direction (arrows 102,102'). This results in the same general sequence of steps, namely; reservoir filling, reservoir opening accompanied by condiment dispensing, and reservoir re-closing, as occurs during forward translation. This bidirectional functionality of design greatly increases the speed and efficiency of the invention.

An additional design aspect which has been found to optimize the operation of the invention relates to the shape of the hoppers 20, 20'. Whereas hoppers designed for dispensing liquids may be conical in shape, a shape is unacceptable for dispensing particulate condiments, due to clogging problems. Accordingly, a preferred shape of the hoppers for a particulate condiment dispenser does not include a top-to-bottom taper. Instead, a straight cylindrical shape has been found to be most desirable for optimizing the transfer of condiments from the hoppers through the transfer openings 56, 56' into the reservoirs 50, 50'. A cylindrical shape of the hoppers tends to direct or coalesce condiments in the hoppers toward the centers 172, 172' of the transfer openings as the hoppers are translated in a forward or reverse direction over the transfer plate. This is because curved, inner walls 174, 174' of the hoppers function as a scoop or consolidating surface to gather stray particles of condiments near the bottom openings 58, 58' of the hoppers and direct the particles toward the centers of the transfer openings. This is a particularly desirable feature when the hoppers are nearly empty of condiments, because virtually all of the condiments can be emptied from the hoppers through the transfer openings without disassembling the device.

In alternate embodiments of the invention, the dispensing apparatus is adapted for use in preparing specific, high production food items. For example, the condiment dispenser illustrated in FIG. 1 is specially adapted for large scale preparation of hamburgers. For this purpose, the transfer tray 30 has legs spaced approximately 34 cm apart, in order to straddle a standard staging tray 16 for hamburgers. In addition, the inter-aperture spacing distance 164 is chosen to be about 9 cm, which is approximately the same as a staging distance 180 separating target midpoints 182 of adjacent hamburgers staged for receiving condiments. This particular design feature, which contributes to the accuracy and uniformity of condiment dispensation, may be readily changed to accommodate different shapes and sizes of target food items.

In addition to the spacing of the dispensing apertures 66, 66', the pattern and uniformity of condiment dispensation can also be changed by adjusting the volume of the aliquoting reservoirs 50, 50', as well as the shape of the dispensing apertures. For hamburgers, a preferred shape of the dispensing apertures is circular, so that a circular pattern of condiments is dispensed onto the hamburger. In addition, a preferred volume of the aliquoting reservoir specifically adapted for dispensing onions on hamburgers has been found to be in the range of 3–4 cm$^3$. For hot dogs, a more appropriate shape of the dispensing aperture is an elongated oval shape, and a larger volume of the reservoir for dispensing larger quantities of condiments may be desirable.

Figure 6:
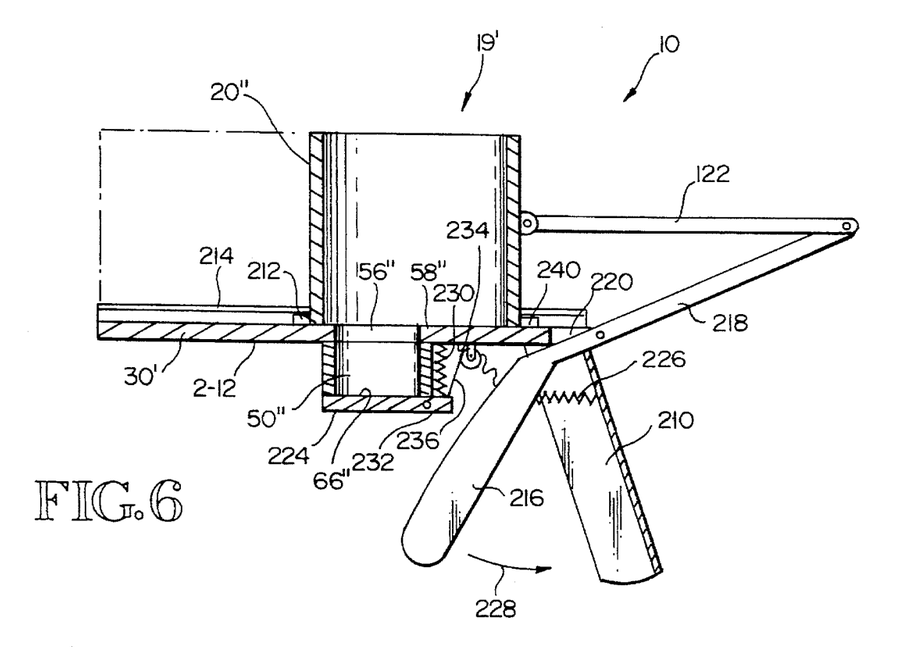
FIG. 6 is a sectional view of an alternate embodiment of the invention.

In a simplified embodiment of the invention, shown in FIG. 6, the dispensing apparatus 10' is a hand-held device having a handgrip 210 attached to the transfer plate 30' for holding the device above the target food item 18. The hopper assembly 19' has a single hopper 20" and is translatably mounted on the transfer plate by lateral flanges 212 at the base of the hopper, which engage side rails 214 of the transfer plate. The flanges and side rails function to guide the hopper and prevent it from dismounting during translation of the hopper over the plate.

In the hand-held embodiment of the invention, the hopper is translated over the transfer plate by action of a lever 216 which has a first arm 218 pivotally connected to a lever-anchoring structure 220, such as the handgrip 210 or transfer plate 30', and a second arm 222 pivotally connected to the hopper 20". The lever is also operatively interconnected with the valve mechanism, or trap-door 224, pivotally mounted to the lower portion of the reservoir 50" to selectably cover the dispensing aperture 66".

A first compression spring 226 compressibly mounted between the lever 216 and handgrip 210 opposes rearward (arrow 228) depression of the lever. A second compression spring 230 compressibly mounted between a rear flange 232 of the trap-door 224 and a spring mounting surface 234 on the underside of the transfer plate exerts closing force to maintain the trap-door in a closed position, i.e., covering the dispensing aperture.

As the lever is partially depressed rearward, the first spring 226 compresses and the hopper assembly 19 is translated forward. Part way through the forward translation path, the bottom opening 58" of the hopper passes into register (as shown in FIG. 6) with the transfer opening 56", so that an aliquot condiments passes from the hopper 20" through the opening into the reservoir 50". While the bottom opening and transfer opening are in register, the trap-door 224 remains in a closed position. i.e. covering the dispensing aperture 66", so that the condiments are held within the reservoir.

Dispensing of condiments from the hand-held embodiment of the invention depends on a trap-door actuating cable 236 which couples operation of the trap-door 224 with translational movement of the hopper assembly 19. The actuating cable has a first end attached to the rear flange 232 of the trap-door, a middle portion passing through a pulley 240 attached to an underside 242 of the transfer plate, and a second end attached to the lever. As the lever is depressed rearward and the hopper assembly translates forward, the cable tightens from an initially slack configuration to a taught configuration. Further depression of the lever, which causes the hopper to forwardly translate out of register with the transfer opening, concomitantly pulls the cable so that the cable exerts opening force on the rear flange opposing the closing force of the second compression spring 230, whereby the trap-door opens and the aliquot of condiments is dispensed onto the food item.

Upon relaxation of the lever, the first compression spring 226 forces the hopper to translate over the plate in a reverse direction, during which an opposite sequence of events occur, i.e. first the trap-door closes as the hopper translates rearwardly toward a registered position with respect to the transfer opening; next the hopper translates rearwardly in full or partial register with the transfer opening, during which another aliquot of food fills the closed reservoir; and, lastly, the hopper translates to a resting position completely out of register with the transfer opening, while the trap-door actuating cable returns to the slack configuration.

In all of the embodiments of the invention, it is particularly desirable to provide easily disassembled components, in order to facilitate storage and cleaning of the device. Toward this objective, the invention provides a hopper assembly 19 which mounts on the transfer plate 30 by gravity and complementary shape characteristics alone. This design enables ready detachment of the hopper assembly from the transfer plate for separate storage and washing. In addition, the gating tray 60 can also be removably mounted with respect to the transfer plate for separate washing and storage. For example, the switching fingers 68, 70 which connect the gating tray to the transfer plate can be removably mounted to the gating tray by screws 250, 250' or other removable fasteners which, when removed, permit disassembly of the gating tray from the transfer plate.

To manufacture the dispensing apparatus of the present invention, a variety of materials can be used, including metals, wood, plastics and other natural and artificial materials. Likewise a variety of manufacturing techniques can be employed, such as conventional molding, casting or cutting methods. The only significant limitations with regard to materials for manufacturing the dispensing device is that the materials must be suitable for use in association with food preparation, and should be reasonably durable and rigid so as to satisfy structural requirements inherent in the dispenser design. In addition, the materials used in manufacturing the device should be readily cleanable and not impart unpleasant tastes or odors to the condiments temporarily contained in the hoppers and reservoirs. A preferred material for most parts of the device is therefore a nontoxic, smooth-finish plastic, such as acrylic.

Those with ordinary skill in the art will appreciate that other embodiments and variations of the invention are possible which employ the same inventive concepts described above. Therefore, the invention is not to be limited by the above disclosure but is to be determined in scope by the claims which follow.

What is claimed is:

1. A device for dispersing particulate condiments comprising:

a transfer plate having all aliquoting reservoir, the reservoir having a transfer opening;

a condiment hopper assembly mounted for translation on the transfer plate and including a condiment hopper having a bottom opening registrable with the transfer opening; and moveable valve means automatically responsive to the position of the hopper assembly with respect to the transfer opening for controlling the dispensing of condiments from the reservoir.

2. The device of claim 1 wherein the reservoir has a transfer opening substantially smaller than the hopper bottom opening.

3. The device of claim 2 including a plurality of reservoirs arranged in a plurality of dispensing rows, and wherein the hopper assembly includes a plurality of hoppers, each hopper having a bottom opening registrable with each transfer opening in a corresponding dispensing row.

4. The device of claim 2 wherein the hopper is substantially cylindrical having only vertically straight sidewalls on a lower portion thereof so that a curved inner wall of the hopper coalesces condiments contained in the hopper toward a center of the transfer opening during translation of the hopper assembly with respect to the plate.

5. The device of claim 1 wherein the hopper assembly includes a hopper carriage slidably mounted on the transfer plate for translating the hopper with respect to the plate.

6. The device of claim 5 wherein the hopper carriage further includes guide means for guiding the hopper assembly during translation of the assembly with respect to the plate.

7. The device of claim 1 further including translating means for translating the hopper assembly with respect to the transfer plate.

8. The device of claim 7 wherein the translating means includes a lever pivotally connected to the hopper assembly.

9. The device of claim 8, wherein the lever has first and second operating positions, and further including spring means biasing the lever toward the first position.

10. The device of claim 7 further including a handgrip mounted to the transfer plate.

11. The device of claim 7 further including coupling means connected to the lever for coupling the valve means to the lever.

12. A device for dispensing particulate condiments, comprising:

a transfer plate having an aliquoting reservoir, the reservoir having a transfer opening;

a condiment hopper assembly mounted for translation on the transfer plate and including a condiment hopper having a bottom opening registrable with the transfer opening; and moveable valve means automatically responsive to the position of the hopper with respect to the transfer opening for controlling the dispensing of condiments from the reservoir, said valve means having first and second closed positions and an open position intermediate said first and second closed positions.

13. The device of claim 12 wherein the valve means includes a gating tray having a release gate registrable with a dispensing aperture of the reservoir for opening the reservoir and a barrier tab registrable with the dispensing aperture for closing the reservoir.

14. The device of claim 13 wherein the gating tray includes means connected to the tray for coupling the tray to the hopper assembly so that the gating tray slides through a complete cycle of opening and closing in response to unidirectional translation of the hopper over the transfer plate.

15. The device of claim 14 wherein the gating tray includes front terminal and rear terminal barrier tabs.

16. The device of claim 14 wherein the coupling means includes a gate-switching finger connected to the tray and engagable by an advancing edge of the hopper assembly.

17. The device of claim 14 wherein the coupling means includes a pair of gate-switching fingers connected to the tray and extending upward through forward and rear gate-switching slots defined by the transfer plate, each finger engagable by an advancing edge of the hopper assembly.

18. The device of claim 13 wherein the transfer plate has a plurality of reservoirs, each reservoir having a transfer opening, and the gating tray includes a plurality of barrier tabs.

19. A device for dispensing particulate condiments, comprising:

a transfer plate having a plurality of aliquoting reservoirs arranged in a plurality of dispensing rows, each reservoir having a transfer opening;

a condiment hopper assembly including a plurality of substantially cylindrical condiment hoppers, each hopper having a bottom opening registrable with at least one of the transfer openings; and valve means including a gating tray slidably mounted beneath the transfer plate for controlling the dispensing of condiments from the reservoir, the tray having coupling means responsive to the position of the hopper assembly so that the gating tray slides through a complete cycle of opening and closing operation in response to unidirectional translation of the hopper.

20. A method for dispensing particulate condiments comprising the steps of:

loading particulate condiments into a hopper translatably mounted above a transfer plate, the plate defining a reservoir having a transfer opening registrable with a bottom opening of the hopper;

translating the hopper with respect to the plate so that the bottom opening successively passes into, then out of, register with a transfer opening;

automatically closing a dispensing aperture of the reservoir while the bottom opening is at least partially in register with the transfer opening: and automatically opening the dispensing aperture while the bottom opening is entirely out of register with the transfer opening, whereby a pre-determined aliquot of condiments is dispensed from the reservoir.

21. The method of claim 20, including the step of coalescing the condiments toward a center of the transfer opening by pushing the condiments across the transfer plate with a curved, vertical surface while translating the hopper.

22. The method of claim 20, including the step of opening and then closing the dispensing aperture while unidirectionally translating the hopper over the transfer plate.

23. A method for dispensing particulate condiments, comprising the steps of:

providing a transfer plate having an aliquoting reservoir defining a transfer opening, and also providing a condiment hopper having a bottom opening substantially larger than the transfer opening;

loading particulate condiments into the hopper;

positioning the hopper for translational motion above and in contact with the transfer plate;

translating the hopper with respect to the plate so that the bottom opening successively passes into, then out of registration with the transfer opening, and simultaneously coalescing the condiments toward a center of the transfer opening by pushing the condiments across the transfer plate with a curved, vertical surface of the hopper;

closing a dispensing aperture of the reservoir while the bottom opening is at least partially in register with the transfer opening; and, opening the dispensing aperture while the bottom opening is out of register with the transfer opening, whereby a pro-determined aliquot of condiments is dispensed from the reservoir.

* * * * *

UNITED STATES PATENT AND TRADEMARK OFFICE
CERTIFICATE OF CORRECTION

PATENT NO. : 5,469,988
DATED : November 28, 1995
INVENTOR(S) : Douglas X. Huang

It is certified that error appears in the above-indentified patent and that said Letters Patent is hereby corrected as shown below:

At column 9, line 5, delete the word "dispersing" and insert the word --dispensing--
At column 9, line 7, delete the word "all" and insert the word --an--
At column 12, line 8, delete the word "pro-determined" and insert the word --pre-determined--

Signed and Sealed this

Twenty-sixth Day of March, 1996

Attest:

BRUCE LEHMAN

Attesting Officer

Commissioner of Patents and Trademarks